US012249312B2

(12) United States Patent
Ku et al.

(10) Patent No.: US 12,249,312 B2
(45) Date of Patent: Mar. 11, 2025

(54) SYNCHRONIZATION OF INSTABILITY MITIGATION IN AUDIO DEVICES

(71) Applicant: Bose Corporation, Framingham, MA (US)

(72) Inventors: Emery M. Ku, Somerville, MA (US); David R. Minich, Natick, MA (US)

(73) Assignee: Bose Corporation, Framingham, MA (US)

( * ) Notice: Subject to any disclaimer, the term of this patent is extended or adjusted under 35 U.S.C. 154(b) by 0 days.

(21) Appl. No.: 18/307,515

(22) Filed: Apr. 26, 2023

(65) Prior Publication Data

US 2023/0260499 A1 Aug. 17, 2023

Related U.S. Application Data

(63) Continuation of application No. 17/317,360, filed on May 11, 2021, now Pat. No. 11,670,278, which is a continuation of application No. 16/570,578, filed on Sep. 13, 2019, now Pat. No. 11,043,201.

(51) Int. Cl.
*G10K 11/178* (2006.01)

(52) U.S. Cl.
CPC .. *G10K 11/17853* (2018.01); *G10K 11/17881* (2018.01); *G10K 2210/1081* (2013.01); *G10K 2210/3026* (2013.01); *G10K 2210/3027* (2013.01); *G10K 2210/3028* (2013.01)

(58) Field of Classification Search
CPC ... G10K 2210/3028; G10K 2210/3026; G10K 2210/1081
USPC ..................................... 381/71.1, 71.6, 71.7
See application file for complete search history.

(56) References Cited

U.S. PATENT DOCUMENTS

| | | | |
|---|---|---|---|
| 5,369,711 | A | 11/1994 | Williamson, III |
| 6,704,428 | B1 | 3/2004 | Wurtz |
| 8,208,650 | B2 | 6/2012 | Joho et al. |
| 8,238,567 | B2 | 8/2012 | Burge et al. |
| 8,238,570 | B2 | 8/2012 | Johnson, Jr. et al. |
| 8,243,946 | B2 | 8/2012 | Burge et al. |
| 8,325,935 | B2 | 12/2012 | Rutschman |
| 8,699,719 | B2 | 4/2014 | Johnson, Jr. et al. |
| 8,798,283 | B2 | 8/2014 | Gauger, Jr. et al. |
| 8,824,695 | B2 | 9/2014 | Bakalos et al. |

(Continued)

FOREIGN PATENT DOCUMENTS

WO 2010129272 11/2010

OTHER PUBLICATIONS

International Search Report and The Written Opinion of The International Searching Authority, International Patent Application No. PCT/US2020/049848, pp. 1-11, dated Dec. 8, 2020.

(Continued)

*Primary Examiner* — Disler Paul
(74) *Attorney, Agent, or Firm* — Bond, Schoeneck & King, PLLC

(57) ABSTRACT

A method and system directed to controlling audio devices with active noise reduction. The system detects a first instability condition in a first headphone based on one or more parameters; alters a parameter of the one or more parameters; and detects a second audio instability condition in the first headphone based on the altered parameter of the one or more parameters. The first and second audio instability conditions are related to audio feedback.

20 Claims, 8 Drawing Sheets

(56) References Cited

U.S. PATENT DOCUMENTS

| | | | | |
|---|---|---|---|---|
| 8,948,409 | B2 * | 2/2015 | Hua | H04R 1/1083 381/94.1 |
| 9,031,271 | B2 | 5/2015 | Pontoppidan | |
| 9,472,180 | B2 | 10/2016 | Olsson | |
| 9,486,823 | B2 | 11/2016 | Andersen et al. | |
| 9,743,170 | B2 | 8/2017 | Yamkovoy | |
| 9,838,812 | B1 | 12/2017 | Shetye et al. | |
| 9,860,626 | B2 | 1/2018 | Ergezer et al. | |
| 9,922,636 | B2 | 3/2018 | Ku | |
| 9,924,255 | B2 | 3/2018 | Patel et al. | |
| 9,949,017 | B2 | 4/2018 | Rule et al. | |
| 9,980,034 | B2 * | 5/2018 | Kumar | G10K 11/17827 |
| 10,045,111 | B1 | 8/2018 | Bonner et al. | |
| 10,049,653 | B2 * | 8/2018 | Kumar | G10K 11/17881 |
| 10,080,092 | B2 | 9/2018 | Shetye et al. | |
| 10,096,313 | B1 | 10/2018 | TerMeulen et al. | |
| 10,206,048 | B2 | 2/2019 | Petersen et al. | |
| 10,244,306 | B1 | 3/2019 | Ku et al. | |
| 10,304,438 | B2 * | 5/2019 | Gether | G10K 11/17875 |
| 10,347,233 | B2 * | 7/2019 | Park | G10K 11/17857 |
| 10,462,551 | B1 | 10/2019 | Kemmerer et al. | |
| 10,602,257 | B1 | 3/2020 | Okuda | |
| 2009/0154720 | A1 | 6/2009 | Oki | |
| 2011/0222701 | A1 | 9/2011 | Donaldson et al. | |
| 2013/0279724 | A1 | 10/2013 | Stafford et al. | |
| 2014/0126756 | A1 | 5/2014 | Gauger, Jr. | |
| 2014/0247952 | A1 * | 9/2014 | Goldstein | H04R 29/00 381/74 |
| 2015/0289065 | A1 | 10/2015 | Jensen et al. | |
| 2018/0114518 | A1 | 4/2018 | Scanlan | |
| 2019/0045291 | A1 | 2/2019 | Kofman | |
| 2019/0052951 | A1 | 2/2019 | Kofman et al. | |
| 2020/0007989 | A1 | 1/2020 | Gong et al. | |
| 2020/0007995 | A1 | 1/2020 | Pedersen et al. | |

OTHER PUBLICATIONS

International Preliminary Report on Patentability, International Patent Application No. PCT/US2020/049848, pp. 1-9, dated Mar. 24, 2022.

* cited by examiner

SYNCHRONIZATION OF INSTABILITY MITIGATION IN AUDIO DEVICES

CROSS-REFERENCE TO RELATED APPLICATIONS

This application is a Continuation of U.S. patent application Ser. No. 17/317,360, filed May 11, 2021, and titled "Synchronization of Instability Mitigation in Audio Devices," which is a Continuation of U.S. patent application Ser. No. 16/570,578, filed Sep. 13, 2019, and titled "Synchronization of Instability Mitigation in Audio Devices," which applications are herein incorporated by reference in their entireties.

BACKGROUND

The present disclosure generally relates to methods and systems directed to controlling audio devices, such as headphones, with active noise reduction.

SUMMARY

All examples and features mentioned below can be combined in any technically possible way.

Generally, in one aspect, a method of controlling an Active Noise Reduction (ANR) audio system is provided. The method comprises: detecting a first instability condition in a first headphone based on one or more parameters, wherein the first audio instability condition is related to audio feedback; altering a parameter of the one or more parameters; and detecting a second audio instability condition in the first headphone based on the altered parameter of the one or more parameters, wherein the second audio instability condition is related to audio feedback.

In an aspect, the first audio instability condition is detected based on a first threshold and the second audio instability condition is detected based on a second threshold, and the second threshold is lower than the first threshold.

In an aspect, the method further comprises generating one or more control signals to adjust one or more ANR parameters of the first headphone using a first controller, wherein the one or more ANR parameters are adjusted to change the first headphone from a first ANR state to a second ANR state to mitigate the first audio instability condition.

In an aspect, the method further comprises adjusting one or more ANR parameters of a second headphone to match the adjusted one or more ANR parameters of the first headphone.

In an aspect, the audio feedback is related to a first microphone of the first headphone and the first microphone is arranged externally to the first headphone and externally to a user's ear canal.

In an aspect, the method further comprises detecting, at a first sensor of the first headphone, at a first time, whether the first headphone is engaged with or removed from an ear of a user; and detecting, at the first sensor of the first headphone, at a second time, whether the first headphone is engaged with or removed from the ear of the user.

In an aspect, the method further comprises returning the first headphone to a first ANR state and returning the second headphone to the first ANR state after detecting that the first headphone was removed from the ear at the first time and detecting that the first headphone was engaged with the ear at the second time.

In an aspect, the method further comprises prompting, a user to take out and then re-insert the first headphone by the audio system.

In an aspect, the method further comprises returning the first headphone to the first ANR state and returning the second headphone to the first ANR state after a predetermined amount of time passes from a time that the one or more ANR parameters of the first headphone was adjusted to bring the first headphone from the first ANR state to the second ANR state to mitigate the first audio instability condition.

In an aspect, the method further comprises detecting that the first headphone switched from the first ANR state to the second ANR state, from the second ANR state to the first ANR state, and then from the first ANR state to the second ANR state a predetermined number of times; and keeping the first headphone in the second ANR state.

In an aspect, the first sensor of the first headphone comprises at least one of: a gyroscope, an accelerometer, an infrared sensor, a magnetometer, an acoustic sensor, a motion sensor, a piezoelectric sensor, a piezoresistive sensor, a capacitive sensor, and a magnetic field sensor.

Generally, in another aspect an Active Noise Reduction (ANR) audio system is provided. The audio system comprises: a first headphone comprising: a first controller arranged to: detect a first audio instability condition in the first headphone based on one or more parameters, wherein the first audio instability condition is related to audio feedback; alter a parameter of the one or more parameters; and detect a second audio instability condition in the first headphone based the altered parameter of the one or more parameters, wherein the second audio instability condition is related to audio feedback.

In an aspect, the first audio instability condition is detected based on a first threshold and the second audio instability condition is detected based on a second threshold, and the second threshold is lower than the first threshold.

In an aspect, the first controller is further arranged to generate one or more control signals to adjust one or more ANR parameters of the first headphone, wherein the one or more ANR parameters are adjusted to change the first headphone from a first ANR state to a second ANR state to mitigate the first audio instability condition.

In an aspect, the system further includes a second headphone comprising a second controller and the second controller is arranged to: receive data sent from the first controller regarding the adjusted one or more ANR parameters in the first headphone; and adjust one or more ANR parameters of the second headphone to match the adjusted one or more ANR parameters of the first headphone.

In an aspect, the system further includes a first sensor of the first headphone arranged to detect at a first time whether the first headphone is engaged with or removed from an ear of a user and detect at a second time whether the first headphone is engaged with or removed from the ear of the user.

In an aspect, the first controller is arranged to return the first headphone to the first ANR state after detecting that the first headphone was removed from the ear at the first time and detect that the first headphone was engaged with the ear at the second time.

In an aspect, the first controller is arranged to return the first headphone to the first ANR state after a predetermined amount of time passes from a time that the one or more ANR parameters of the first headphone was adjusted to bring the first headphone from the first ANR state to the second ANR state to mitigate the first audio instability condition.

In an aspect, the first controller is arranged to detect that the first headphone switched from the first ANR state to the second ANR state, from the second ANR state to the first ANR state, and then from the first ANR state to the second ANR state a predetermined number of times and keep the first headphone in the second ANR state.

In an aspect, the first sensor of the first headphone includes at least one of: a gyroscope, an accelerometer, an infrared sensor, a magnetometer, an acoustic sensor, a motion sensor, a piezoelectric sensor, a piezoresistive sensor, a capacitive sensor, and a magnetic field sensor.

DETAILED DESCRIPTION

In headphones, such as wireless headphones, which have Active Noise Reduction ("ANR") capability, instability may be detected in a headphone and ANR parameters in that headphone may be altered to mitigate instability. The present disclosure provides methods and systems directed to automatically adjusting the ANR parameters in one headphone when ANR parameters have been altered in another headphone after detection of instability. As an example, after an instability condition is detected in a first headphone, one or more control signals are generated to adjust one or more ANR parameters of the first headphone. The one or more ANR parameters are adjusted to change the first headphone from a first ANR state to a second ANR state, for example from a more aggressive ANR mode to a less aggressive ANR mode, which, for example, reduces noise in a narrower frequency range or depth, to mitigate the instability condition. The controller in the first headphone synchronizes the altered ANR parameters with the second headphone. The system automatically returns the first headphone and the second headphone to the first ANR state, e.g., the more aggressive ANR mode, after detecting that the headphone in which an instability condition was detected has been removed from and returned to the ear of the user. Alternatively, other methods may be utilized to return the headphones to the first ANR state, such as using a configurable timer. It has been observed that when the ANR parameters of the first headphone and the second headphone which have been altered to mitigate instability are synchronized, the user experience is improved.

Figure 1:
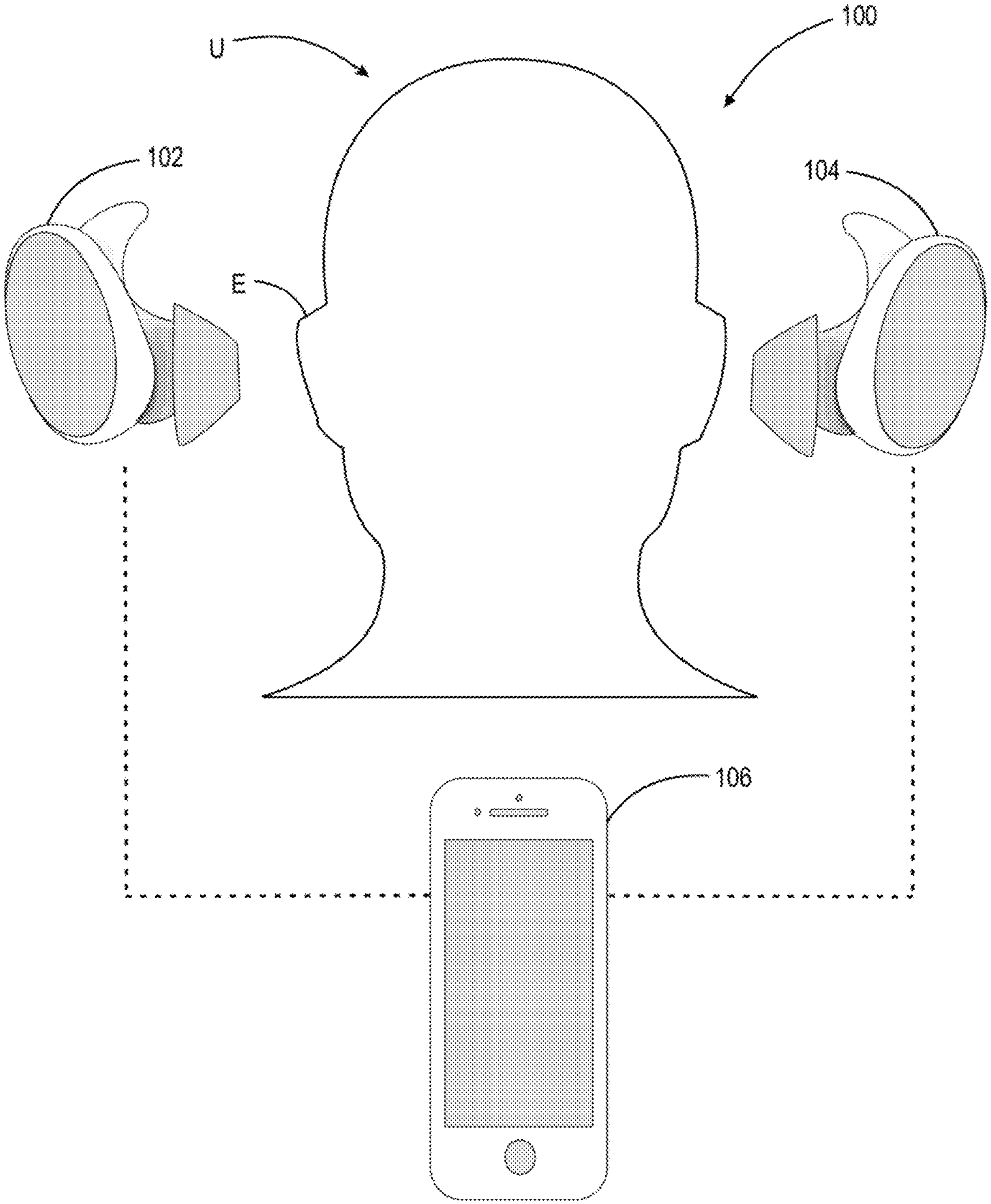
FIG. 1 illustrates an example of an audio system of the present disclosure.

The term "headphone" is intended to mean a device that fits around, on, in, or near an ear and that radiates acoustic energy into or towards the ear canal. Headphones are sometimes referred to as earphones, earpieces, headsets, earbuds or sport headphones, and can be wired or wireless. A headphone includes an acoustic driver to transduce audio signals to acoustic energy. The acoustic driver may be housed in an earcup. While some of the figures and descriptions following may show a single headphone, a headphone may be a single stand-alone unit or one of a pair of headphones (each including a respective acoustic driver and earcup), one for each ear. A headphone may be connected mechanically to another headphone, for example by a headband and/or by leads that conduct audio signals to an acoustic driver in the headphone. A headphone may include components for wirelessly receiving audio signals. A headphone may include components of an active noise reduction system. Headphones may also include other functionality such as a microphone so that they can function as a headset. While FIG. 1 shows an example of an around-ear headset, in other examples the headset may be an in-ear, on-ear, or near-ear headset. In some examples, a headphone may be an open-ear device that includes an acoustic driver to radiate acoustic energy towards the ear canal while leaving the ear open to its environment and surroundings.

Referring now to the drawings, FIG. 1 schematically illustrates audio system 100. Audio system 100 generally includes first headphone 102, second headphone 104, and first device 106. First headphone 102 and second headphone 104 are both arranged to communicate with first device 106 and/or communicate to each other. First device 106 may be any device capable of establishing a connection with first headphone 102 and/or second headphone 104, either wirelessly through wireless protocols known in the art, or via a wired connection, i.e., via a cable capable of transmitting a data signal from first device 106 to first headphone 102 or second headphone 104. In one example, first device 106 is a smartphone having a computer executable application installed thereon such that the connection between first device 106, first headphone 102 and/or second headphone 104 can be mutually established using a user interface on first device 106. As one example, first headphone 102 and/or second headphone 104 may connect to a server in the cloud or internet capable of transmitting a data signal to first headphone 102 or second headphone 104 and first device 106 may not be needed.

Figure 2A:
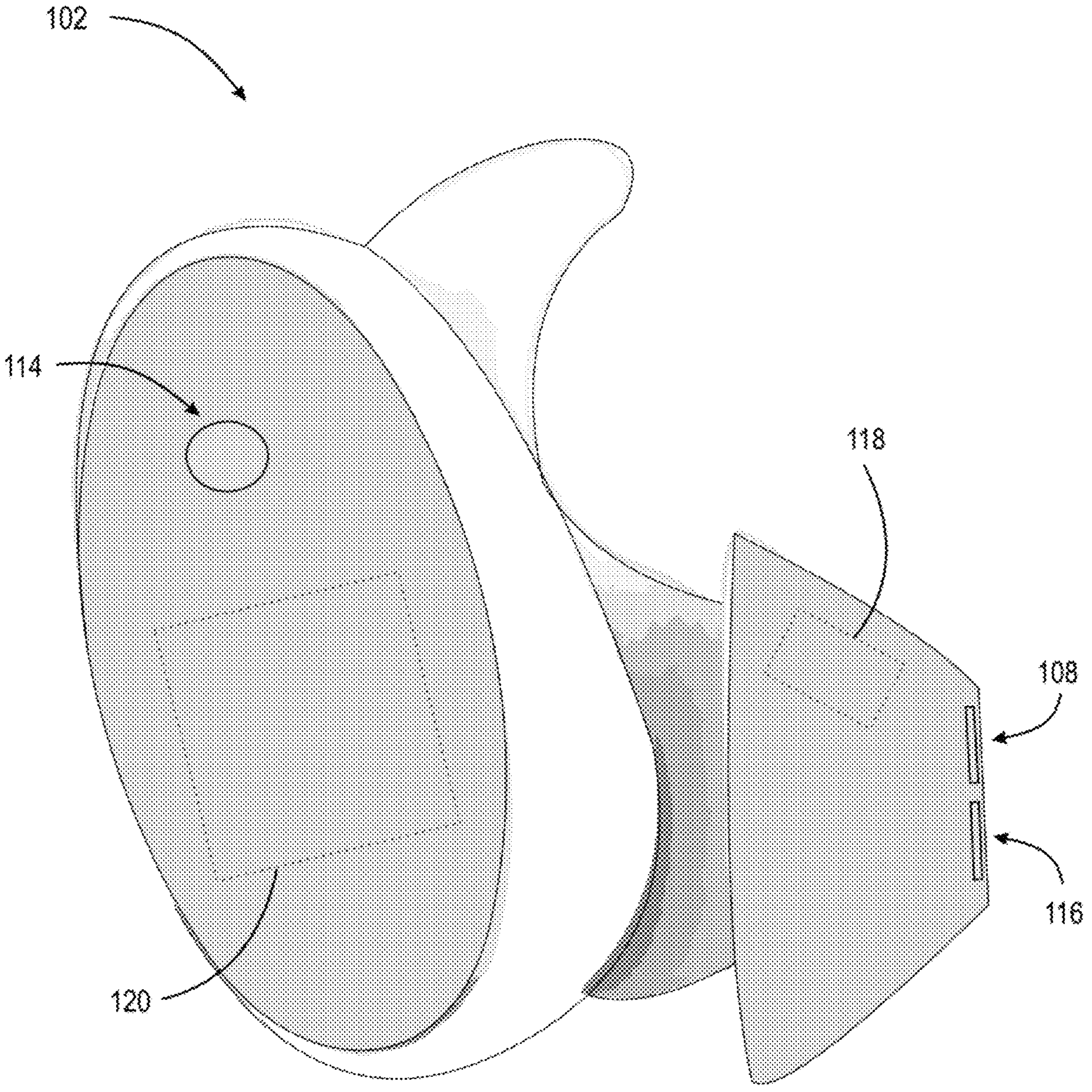
FIG. 2A illustrates a first headphone according to an example of the present disclosure.

FIG. 2A illustrates first headphone 102. First headphone 102 includes a housing, which further includes first driver 108, which is an acoustic transducer for conversion of, e.g., an electrical signal, into an audio signal that the user may hear, and (referring to FIG. 3A) first antenna 110. The first audio signal may correspond to data related to at least one digital audio file, which can be streamed over a wireless connection to first device 106 or first headphone 102, stored in first memory 112 (discussed below), or stored in the memory of first device 106. First antenna 110 is arranged to send and receive wireless communication information from, e.g., second headphone 104 or first device 106. First headphone 102 includes a controllable ANR subsystem. First headphone 102 includes one or more microphones, such as a first feedforward microphone 114 and/or a first feedback microphone 116. The first feedforward microphone 114 may be configured to sense acoustic signals external to the first headphone 102 when properly worn, e.g., to detect acoustic signals in the surrounding environment before they reach the user's ear. The feedback microphone 116 may be configured to sense acoustic signals internal to an acoustic volume formed with the user's ear when the first headphone 102 is properly worn, e.g., to detect the acoustic signals reaching the user's ear. In various examples, one or more drivers may be included in a headphone, and a headphone may in some cases include only a feedforward microphone or only a feedback microphone (or multiple feedback and/or feedforward microphones). Additionally, first headphone 102 may also include first sensor 118 in order to detect proximity to or engagement with ear E of user U. Although shown in FIG. 2A as being arranged on an ear tip of first headphone 103, first sensor 118 could alternatively be arranged on or within the housing of first headphone 102. First sensor 118 can be any of: a gyroscope, an accelerometer, a magnetometer, an infrared (IR) sensor, an acoustic sensor (e.g., a microphone or acoustic driver), a motion sensor, a piezoelectric sensor, a piezoresistive sensor, a capacitive sensor, a magnetic field sensor, or any other sensor known in the art capable of determining whether first headphone 102 is proximate to, engaged with, within, or removed from ear E of user U.

Figure 3A:
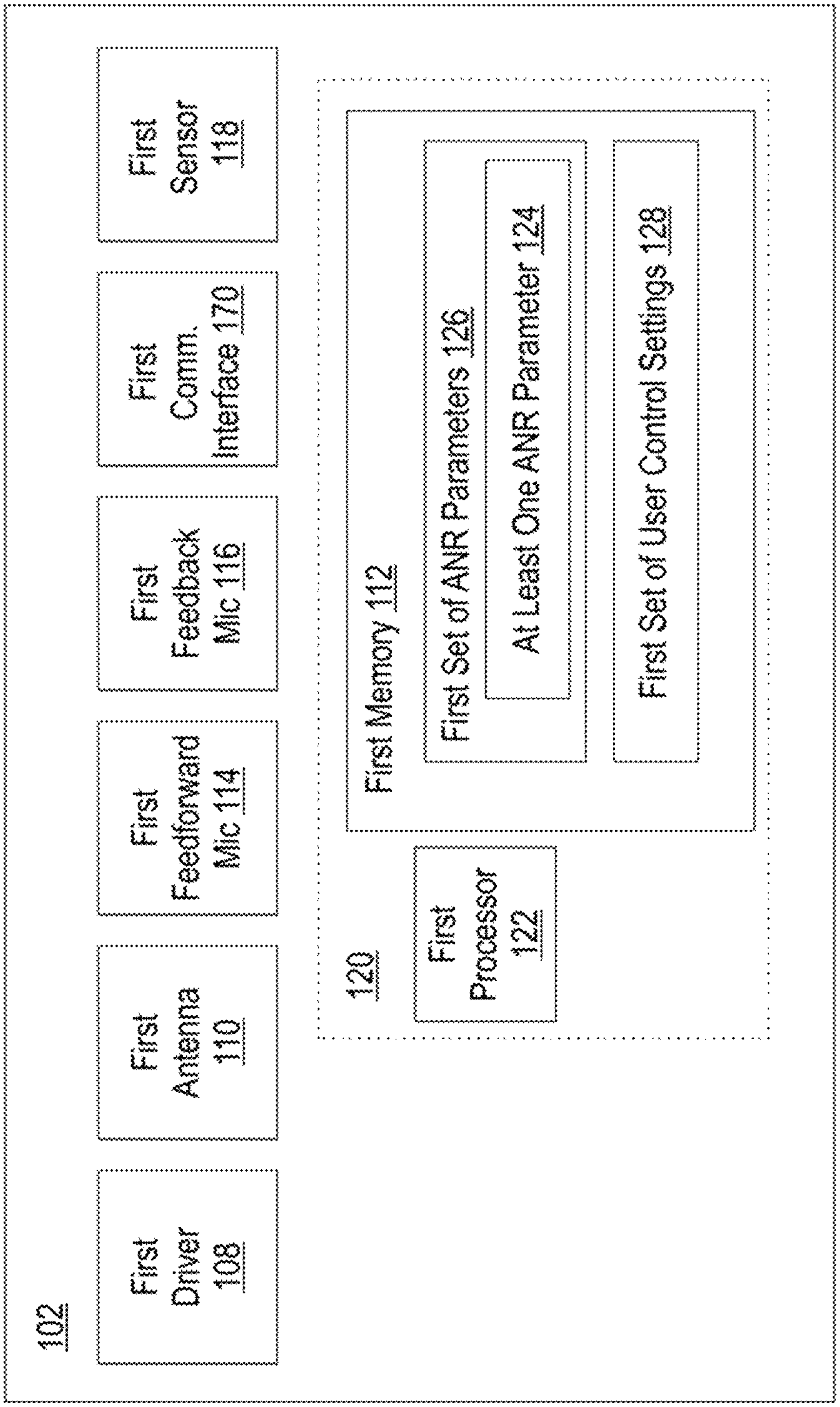
FIG. 3A schematically illustrates one example configuration of components included in a first headphone according to the present disclosure.

Referring to FIG. 3A, first headphone 102 further includes first controller 120. In an example, first controller 120 includes at least first processor 122 and first memory 112. The first processor 122 and first memory 112 of first controller 120 are arranged to receive, send, store, and execute at least one ANR parameter 124 of a set of ANR parameters 126 which may relate to a feedback filter, a feedforward filter, or audio equalization, based on a signal from the first feedforward microphone 114 and/or first feedback microphone 116. The first processor 122 and first memory 112 of first controller 120 are arranged to receive, send, store, and execute at least one user control setting of a first set of user control settings 128. In an example, first set of user control settings 128 can include settings such as, but not limited to: increase or decrease volume of the audio signal being reproduced by the audio system 100; start/play/stop/pause the audio signal being reproduced by the audio system 100; answer or decline a phone call; accept or dismiss a notification; and access a voice assistant, such as Alexa, Google Assistant, or Siri.

Figure 2B:
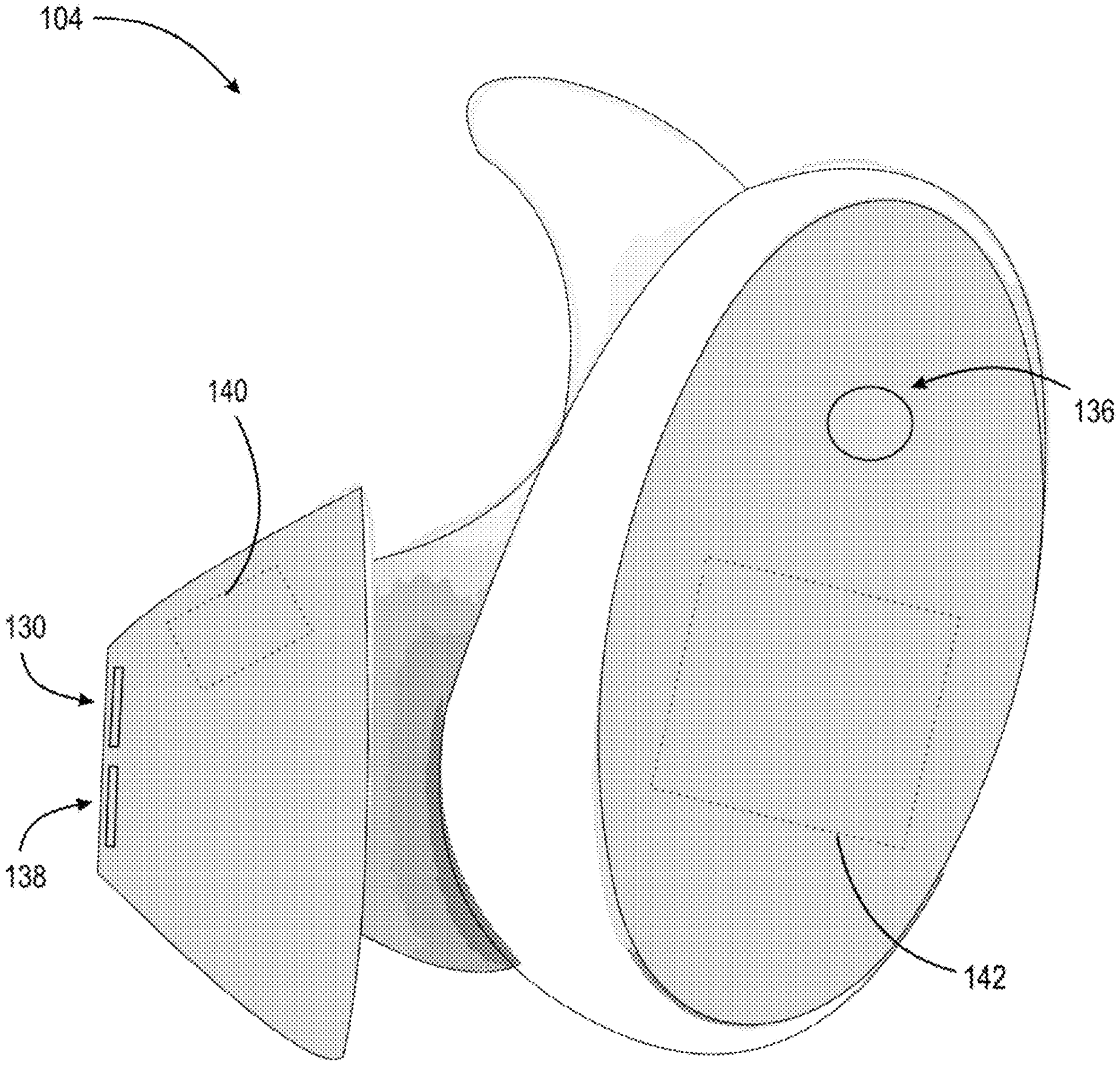
FIG. 2B illustrates a second headphone according to an example of the present disclosure.

FIG. 2B illustrates second headphone 104. Second headphone 104 also includes a housing, which further includes second driver 130 arranged to reproduce a second audio signal and (referring to FIG. 3B) second antenna 132. The second audio signal may correspond to data related to at least one digital audio file which can be streamed over a wireless connection to first headphone 102 or second headphone 104, stored in second memory 134 (discussed below), or stored in the memory of first device 106. Second antenna 132 is arranged to send and receive wireless communication information from, e.g., first headphone 102 or first device 106. Second headphone 104 also includes a controllable Active Noise Reduction system. Second headphone 104 includes one or more microphones, such as a second feedforward microphone 136 and/or a second feedback microphone 138. In various examples, one or more drivers may be included in a headphone, and a headphone may in some cases include only a feedforward microphone or only a feedback microphone (or multiple feedback and/or feedforward microphones). Second headphone 104 may also include second sensor 140 in order to detect proximity to or engagement with ear E of user U. Although shown in FIG. 2B as being arranged on an ear tip of second headphone 104, second sensor 140 could alternatively be arranged on or within the housing of second headphone 104. Second sensor 140 can be any of: a gyroscope, an accelerometer, a magnetometer, an infrared (IR) sensor, an acoustic sensor (e.g., a microphone or acoustic driver), a motion sensor, a piezoelectric sensor, a piezoresistive sensor, a capacitive sensor, a magnetic field sensor, or any other sensor known in the art capable of determining whether second headphone 104 is proximate to, engaged with, within, or removed from ear E of user U.

Figure 3B:
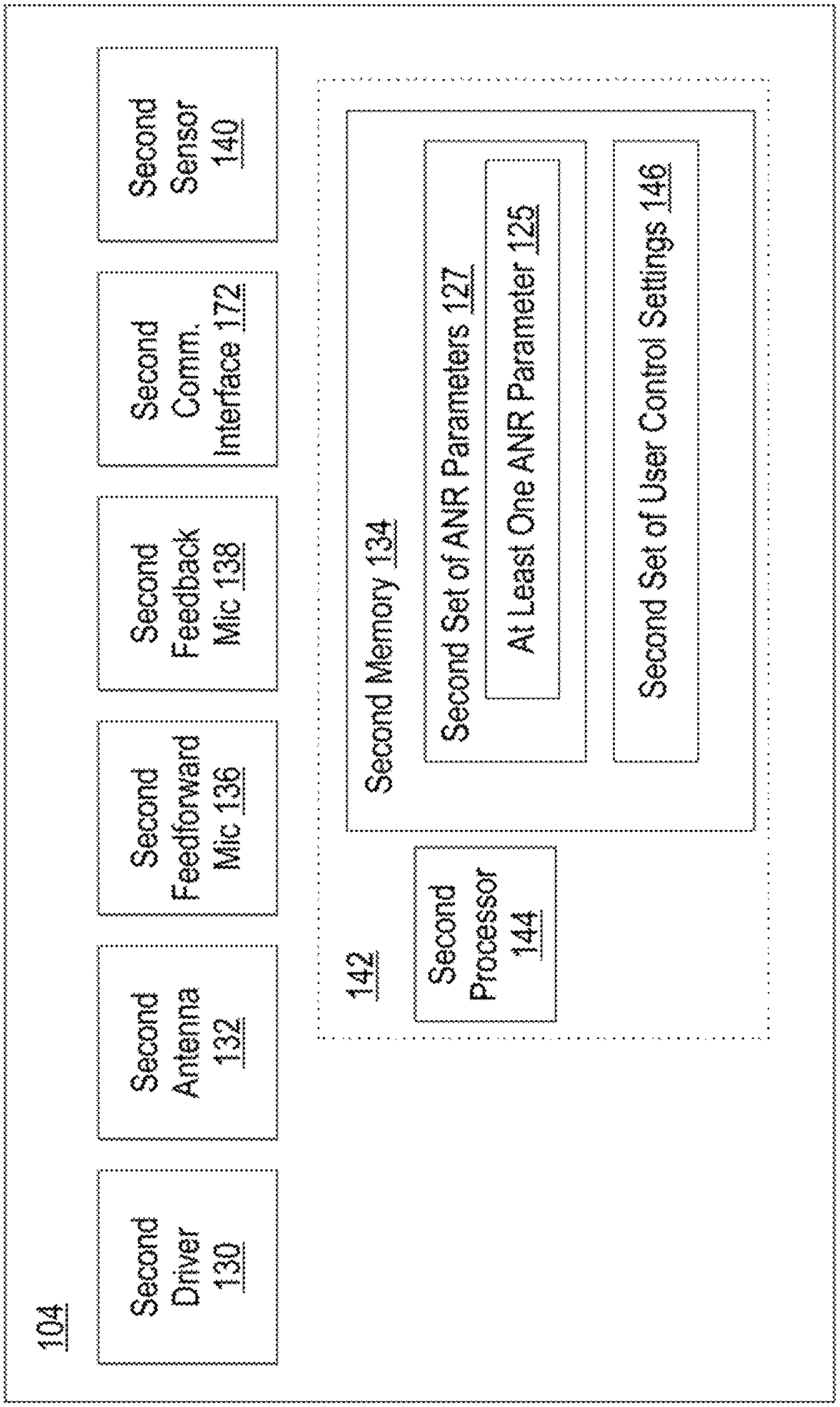
FIG. 3B schematically illustrates one example configuration of components included in a second headphone according to the present disclosure.

Referring to FIG. 3B, second headphone 104 further includes second controller 142. In an example, second controller 142 includes at least second processor 144 and second memory 134. The second processor 144 and second memory 134 of second controller 142 are arranged to receive, send, store, and execute at least one ANR parameter 125 of a set of ANR parameters 127 which may relate to a feedback filter, a feedforward filter, and an audio equalization, based on a signal from a second feedforward microphone 136 and/or second feedback microphone 138. The second processor 144 and second memory 134 of second controller 142 are also arranged to receive, send, store, and execute at least one user control setting of a second set of user control settings 146.

ANR subsystems are used for cancelling or reducing unwanted or unpleasant noise. An ANR subsystem can include an electroacoustic or electromechanical system that can be configured to cancel at least some of the unwanted noise (often referred to as primary noise) based on the principle of superposition. This can be done by identifying an amplitude and phase of the primary noise and producing another signal (often referred to as an anti-noise signal) of about equal amplitude and opposite phase. An appropriate anti-noise signal combines with the primary noise such that both are substantially canceled at the location of an error sensor (e.g., canceled to within a specification or acceptable tolerance). In this regard, in the example implementations described herein, "canceling" noise may include reducing the "canceled" noise to a specified level or to within an acceptable tolerance, and does not require complete cancellation of all noise. Noise canceling systems may include feedforward and/or feedback characteristics. A feedforward component detects noise external to the headset (e.g., via an external microphone) and acts to provide an anti-noise signal to counter the external noise expected to be transferred through to the user's ear. A feedback component detects acoustic signals reaching the user's ear (e.g., via an internal microphone) and processes the detected signals to counteract any signal components not intended to be part of the user's acoustic experience. Although described herein as coupled to, or placed in connection with, other systems, through wired or wireless means, it should be appreciated that noise cancelling systems may be independent of any other systems or equipment.

Figure 4:
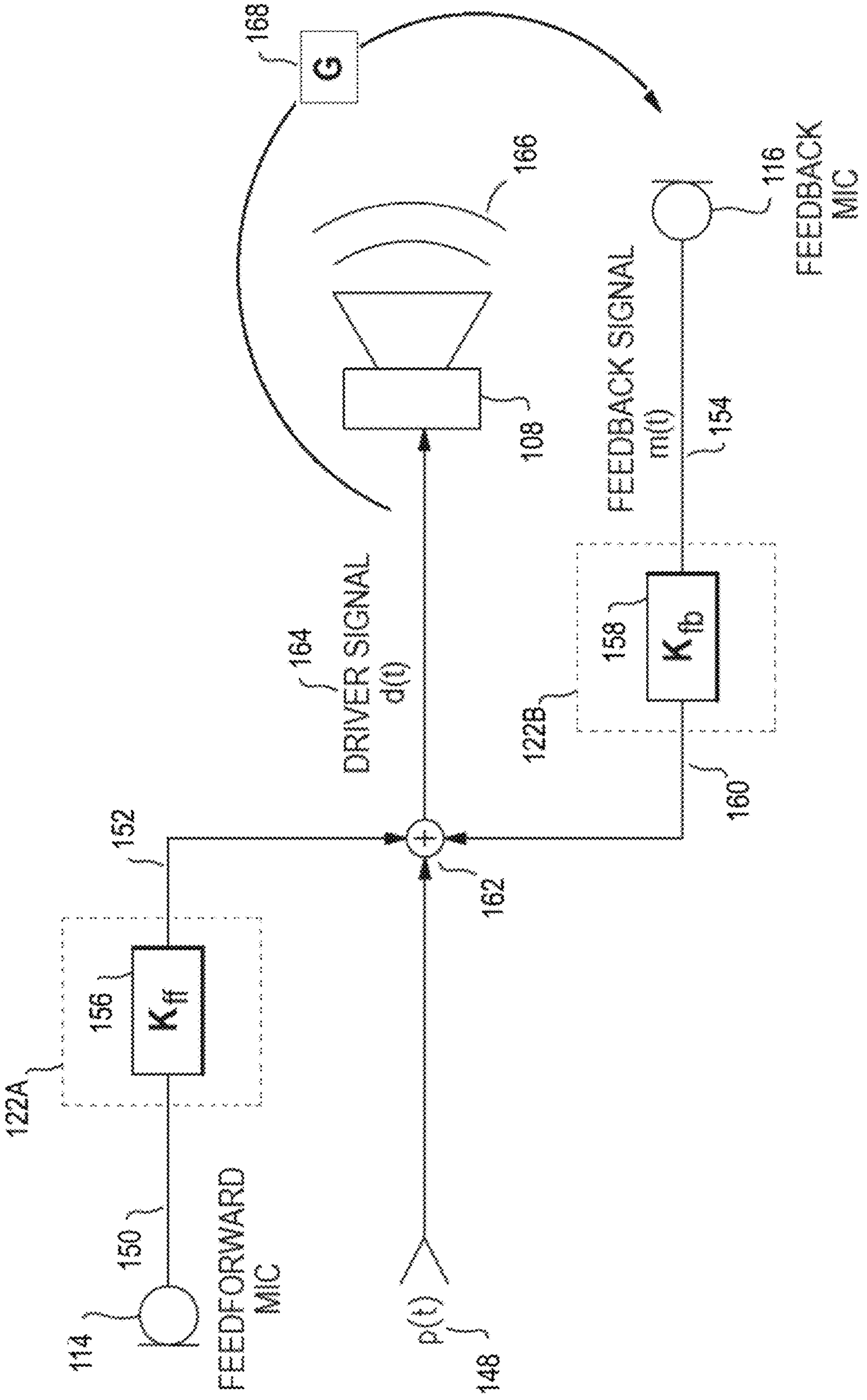
FIG. 4 is a schematic diagram of an exemplary active noise reduction system incorporating feedback and feedforward components.

FIG. 4 illustrates an exemplary system and method of processing microphone signals, for example in the first headphone 102, to reduce noise reaching the ear E of user U. Although the below example describes an instability condition in the first headphone 102, it should be appreciated that both the first headphone 102 and the second headphone 104 have separate first controller 120 and second controller 142, which can each detect and mitigate an instability condition in the first headphone 102 and the second headphone 104, respectively, and the systems and methods described below can also be implemented on the second headphone 104. FIG. 4 presents a simplified schematic diagram to highlight features of a noise reduction system. Various examples of a complete system may include amplifiers, analog-to-digital conversion (ADC), digital-to-analog conversion (DAC), equalization, sub-band separation and synthesis, and other signal processing or the like. In some examples, a playback signal 148, p(t), may be received to be rendered as an acoustic signal by the first driver 108. The first feedforward microphone 114 may provide a feedforward signal 150 that is processed by a feedforward processor 122A of the first processor 122, having a feedforward transfer function 156, Kff, to produce a feedforward anti-noise signal 152. The first feedback microphone 116 may provide a feedback signal 154 that is processed by a feedback processor 122B of the first processor 122, having a feedback transfer function 158, Kfb, to produce a feedback anti-noise signal 160. In various examples, any of the playback signal 148, the feedforward anti-noise signal 152, and/or the feedback anti-noise signal 160 may be combined, e.g., by a combiner 162, to generate a driver signal 164, d(t), to be provided to the first driver 108. In various examples, any of the playback signal 148, the feedforward anti-noise signal 152, and/or the feedback anti-noise signal 160 may be omitted and/or the components necessary to support any of these signals may not be included in a particular implementation of a system.

The first feedback microphone 116 may be configured to detect sound within the acoustic volume that includes the user's ear and, accordingly, may detect an acoustic signal 166 produced by the first driver 108, such that a loop exists. Accordingly, in various examples and/or at various times, a feedback loop may exist from the driver signal 164 through the first driver 108 producing an acoustic signal 166 that is picked up by the feedback microphone, e.g., first feedback microphone 116, processed through the feedback transfer function 158, Kfb, and included in the driver signal 164. Accordingly, at least some components of the feedback signal 154 are caused by the acoustic signal 166 rendered from the driver signal 164. Alternately stated, the feedback signal 154 includes components related to the driver signal 164. The response of the feedback signal 154 to the driver signal 164 is characterized by the plant transfer function 168, G.

When an ANR subsystem is deployed in headphones, certain unstable conditions, if not addressed quickly, can cause the headphones to generate a loud noise that is uncomfortable for the user. Instability can occur in a variety of ways. As one example, the unstable condition can occur, for example, due to changes in the transfer function of a sound path between the first driver 108 and the first feedback microphone 116 of the controllable ANR subsystem. This can happen, for example, if the acoustic path between the first driver 108 and the first feedback microphone 116 is changed in size or shape. The condition may be demonstrated, for example, by blocking the opening (e.g., using a finger or palm) through which sound emanates out of the headphone. In the case of a headphone having a nozzle with an acoustic passageway that acoustically couples a front cavity of an acoustic transducer to a user's ear canal, this condition may be referred to as a blocked-nozzle condition. This condition can result in practice, for example, during placement/removal of the headphone in the ear. This effect may be particularly observable in smaller headphones (e.g., in-ear earphones), where the secondary path can change if the earphone or hearing-aid is moved while being worn. For example, moving an in-ear earphone can cause the volume of air in the corresponding secondary path to change, thereby causing the controllable ANR subsystem to be rendered unstable.

As another example, the unstable condition can arise in an audio system 100 that includes an "aware mode" feature, where an external microphone, e.g., first feedforward microphone 114, is used to detect external sounds that the user may want to hear, and the first processor 122 is configured to pass such sounds through, for example, to be reproduced by the first driver 108, or to pass through with only a small amount of signal processing. In implementations where a headphone includes an aware mode, some conditions can lead to the onset of an unstable condition. For example, if the output of the first driver 108 gets fed back to the first feedforward (or external) microphone 114, and the first processor 122 passes the signal back to the first driver 108 (as typical in an aware mode), this can lead to a fast-deteriorating unstable condition that results in an objectionable sound emanating from the first driver 108. This can be demonstrated, for example, by cupping a hand around a headphone to facilitate a feedback path between the first driver 108 and the external microphone 114. Another example of pressure fluctuations that can result in an unstable condition is a significant change in the ambient pressure of air relative to normal atmospheric pressures at sea level. Instability detection in accordance with aspects and examples described herein may increase the range of bandwidths in which noise reduction by an ANR processor may be effective.

Detection of an instability condition can be accomplished by analyzing a relationship between a feedback microphone signal and a driver signal (e.g., by comparison of the feedback signal 154 to the driver signal 164) as explained in U.S. Pat. No. 10,244,306, the entire content of which is incorporated herein by reference. Other systems and methods of detecting and mitigating instability are described in U.S. Pat. No. 9,922,636, the entire content of which is incorporated herein by reference. When instability is detected, the systems described herein may respond in various ways to mitigate or remove the instability and/or the undesirable consequences of the instability, such as by adjusting ANR parameters. For example, an audio system may adjust a feedback filter, e.g., the gain associated with a filter applied to a feedback microphone, e.g. first feedback microphone 116, of the controllable ANR subsystem; adjust a feedforward filter, e.g., the gain associated with a filter applied to a feedforward microphone, e.g. first feedforward microphone 114, of the ANR subsystem; adjust audio equalization settings; alter or replace the feedback transfer function 158; alter processing of the feedback or feedforward signal; change to a less aggressive form of noise reduction; alter various parameters of the noise reduction system to be less aggressive; alter a driver signal amplitude (e.g., mute, reduce, or limit the driver signal 164); alter a processing phase response, e.g., of the driver signal 164 and/or feedback signal 154 or feedforward signal 150 in an attempt to disrupt the instability; provide an indicator to a user (e.g., an audible or vocal message, an indicator light, etc.); and/or other actions. In some cases, the ability to detect and respond to unstable conditions may allow for design of more aggressive feedback or feedforward compensators that operate over a wider range of frequencies than would be otherwise possible. In addition, in response to detecting an instability condition, the parameters for detecting an instability condition may be altered, so that instability is detected dynamically, for example, by lowering the threshold to detect and respond to an instability condition after an instability condition is detected.

During operation of audio system 100, first headphone 102 and/or second headphone 104 can pair (e.g. using known Bluetooth, Bluetooth Low Energy, or other wireless protocol pairing) or connect with first device 106, e.g., a smartphone. An audio stream may be established between first device 106, first headphone 102, and second headphone 104. The audio stream can include data relating to an audio file streamed over a wireless connection or a stored audio file. An ANR subsystem may be operational on the first headphone 102 and second headphone 104 to reduce unwanted noise from the environment, with the first headphone 102 operating with the first set of ANR parameters 126 and the second headphone 104 operating with the second set of ANR parameters 127. In systems with separately controllable ANR subsystems for each headphone, an unstable condition which may cause an instability condition may be detected in one headphone, for example, the first headphone 102, due, for example, to the positioning of the first headphone 102 in the ear which results in a blocked nozzle. The first controller 120 may detect the instability condition according to the methods described above. The first controller 120 then may generate one or more control signals to adjust one or more ANR parameters of the first headphone, e.g., the first set of ANR parameters 126. For example, the first controller 120 may alter the gain associated with a filter applied to the first feedback microphone 116, adjust the gain associated with a filter applied to the first feedforward microphone 114, or adjust audio equalization settings of the first headphone 102 to alter the ANR parameters to less aggressive ANR settings which may, for example, reduce or cancel unwanted noise in a narrower frequency range or in less depth. The first ANR state is an operational state where the ANR parameters are set as they were set when the instability condition was detected, and the second ANR state describes the operational state where the ANR parameters have been adjusted to mitigate the instability condition. The first controller 120 then sends data to the second controller 142 regarding the one or more ANR parameters of first set of ANR parameters 126 which have been adjusted. The second controller 142 receives the data regarding the one or more ANR parameters 124 of first set of ANR parameters 126 which have been adjusted and adjusts the second set of ANR parameters 127 to match the ANR parameters of the first headphone 102 in the second ANR state. It can be appreciated that under certain circumstances it may be advantageous for the system 100 to have ANR parameters on one headphone that are different from the ANR parameters on another headphone. For example, second controller 142 may alter fewer than all the ANR parameters which were adjusted by the first controller 120 for the first headphone 102 for the second headphone 104.

If a sensor, e.g., first sensor 118, detects that the headphone in which an instability condition was detected, in this case the first headphone 102, was engaged with a user's ear at a first time and then removed from the user's ear at the second time, then the first controller 120 will alter the ANR parameters of the first headphone 102 to the bring the ANR settings to the first ANR state. The first controller 120 will then send data regarding the one or more ANR parameters 124 that have been adjusted to the second controller 142 which adjusts the second set of ANR parameters 127 to bring the second headphone 104 to the first ANR state. The user may also, as an example, be prompted by the audio system to take out and then re-insert the headphone in which an instability condition has been detected. The prompt may be provided by the ANR controller or any other controller operating in the audio system. The user may receive the prompt as an auditory, visual, or tactile prompt on the headphones 102/104 or the first device 106. As another example, the first or second controller 120/142, or any other controller of the audio system, may contain a timer, and may return the first headphone 102 and the second headphone 104 to the first state after a predetermined amount of time passes from the time that the first headphone 102 and/or second headphone 104 was switched from the first ANR state to the second ANR state after an instability condition was detected. As another example, if the first/second controller 120/142 detects that the first/second headphone 102/104 switched from the first ANR state to the second ANR state in response to an instability condition, then switched from the second ANR state back to the first ANR state after a predetermined amount of time passed, and the headphone again switched from the first ANR state to the second ANR state in response to an instability condition, a predetermined number of times, the first/second controller 120/142 may keep the first headphone 102 and the second headphone 104 in the second ANR state and not return them to the first ANR state. As another example, the predetermined amount of time that has to pass is configurable, for example, so that the amount of time that needs to pass for the headphones to switch from the second ANR state to the first ANR state increases as the ANR states of the headphones are switched a greater number of time in response to the instability condition. As another example, the predetermined amount of time that has to pass is configurable, for example, so that the amount of time depends on how soon after returning to the more aggressive state a new instability condition is detected.

Figure 5:
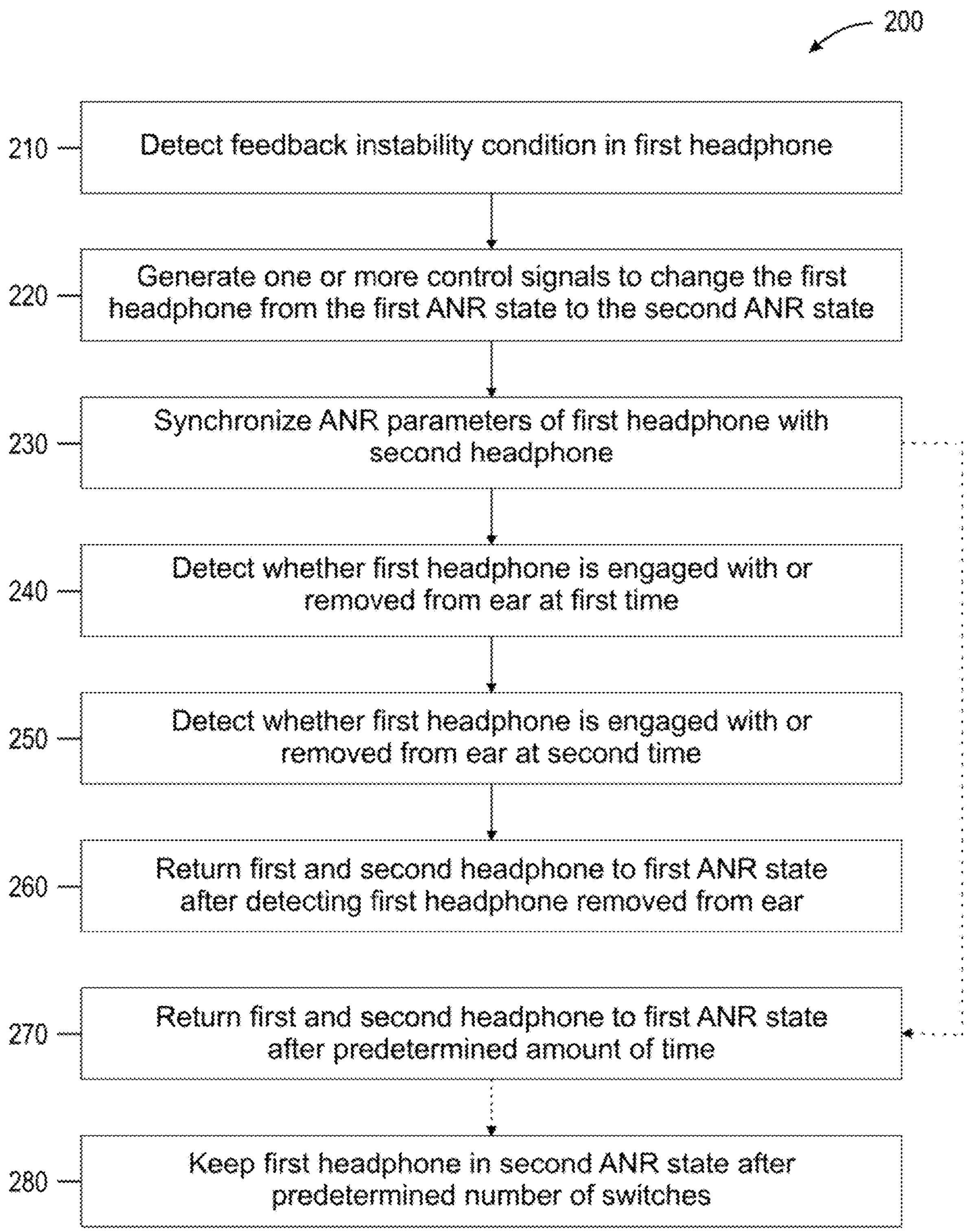
FIG. 5 is a flow-chart illustrating the steps of a method according to aspects of the present disclosure.

FIG. 5 is a flow-chart illustrating the steps of a method of controlling an audio system according to the present disclosure. The method 200 includes the steps of: detecting an instability condition in a first headphone 102 (step 210); generating one or more control signals to adjust one or more ANR parameters of the first headphone 102 using a first Active Noise Reduction (ANR) controller, wherein the one or more ANR parameters are adjusted to change the first headphone 102 from a first ANR state to a second ANR state to mitigate the instability condition (step 220); synchronizing the one or more ANR parameters of the first headphone 102 with one or more parameters of a second headphone 104 (230); detecting, at a first sensor 118 of the first headphone 102, at a first time, whether the first headphone 102 is engaged with or removed from an ear of a user (step 240); detecting, at a first sensor 118 of the first headphone 102, at a second time, whether the first headphone 102 is engaged with or removed from the ear of the user (step 250); and returning the first headphone 102 to the first ANR state and returning the second headphone 104 to the first ANR state after detecting that the first headphone 102 was removed from the ear at the first time and detecting that the first headphone 102 was engaged with the ear at the second time (260). Furthermore, the method may include the step of returning the first headphone 102 to the first ANR state and returning the second headphone 104 to the first ANR state after a predetermined amount of time passes from a time that the one or more ANR parameters of the first headphone 102 was adjusted to bring the first headphone 102 from the first ANR state to the second ANR state to mitigate the instability condition (step 270). The method may also include the step of detecting that the first headphone 102 switched from the first ANR state to the second ANR state, from the second ANR state to the first ANR state, and then from the first ANR state to the second ANR state a predetermined number of times; and keeping the first headphone 102 in the second ANR state (step 280).

Figure 6:
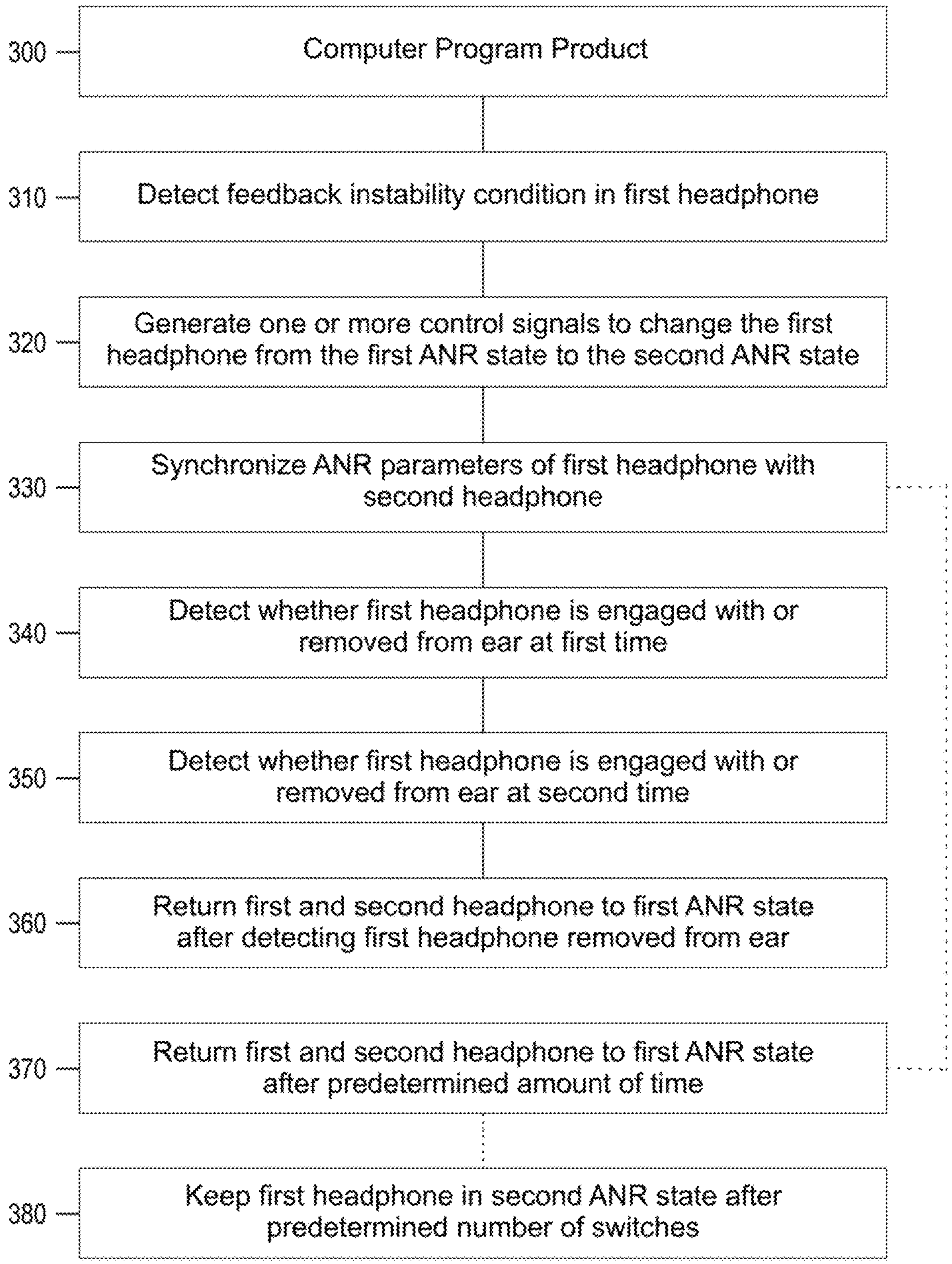
FIG. 6 is a representation of a computer program product according to aspects of the present disclosure.

A computer program product 300 (shown in FIG. 6) for performing a method for controlling an audio system can have a set of non-transitory computer readable instructions. The set of non-transitory computer readable instructions can be stored and executed on a memory 112/134 and a processor 122/144 of a first headphone 102 and second headphone 104 (shown in FIGS. 2A and 2B). The set of non-transitory computer readable instructions can be arranged to: detect an instability condition in a first headphone 102 (310); generate one or more control signals to adjust one or more ANR parameters of the first headphone 102 using a first Active Noise Reduction (ANR) controller, wherein the one or more ANR parameters are adjusted to change the first headphone 102 from a first ANR state to a second ANR state to mitigate the instability condition (320); and synchronize the one or more ANR parameters of the first headphone 102 with one or more parameters of a second headphone 104 (330); detect, at a first sensor 118 of the first headphone, at a first time, whether the first headphone 102 is engaged with or removed from an ear of a user; and detect, at a first sensor 118 of the first headphone, at a second time, whether the first headphone 102 is engaged with or removed from the ear of the user (340); return the first headphone 102 to the first ANR state and return the second headphone 104 to the first ANR state after detecting that the first headphone 102 was removed from an ear of a user at the first time and detecting that the first headphone 102 was engaged with the ear at the second time (350); and return the first headphone 102 to the first ANR state after a predetermined amount of time passes from a time that the one or more ANR parameters of the first headphone 102 was adjusted to bring the first headphone 102 from the first ANR state to the second ANR state to mitigate the instability condition (360).

Furthermore, the set of non-transitory computer readable instructions can be arranged to: return the first headphone 102 to the first ANR state and return the second headphone 104 to the first ANR state after a predetermined amount of time passes from a time that the one or more ANR parameters of the first headphone 102 was adjusted to bring the first headphone 102 from the first ANR state to the second ANR state to mitigate the instability condition (370). The set of non-transitory computer readable instructions can be arranged to: detect that the first headphone 102 or from the first ANR state to the second ANR state, from the second ANR state to the first ANR state, and then from the first ANR state to the second ANR state a predetermined number of times; and keep the first headphone 102 in the second ANR state (380).

The above-described examples of the described subject matter can be implemented in any of numerous ways. For example, some aspects may be implemented using hardware, software or a combination thereof. When any aspect is implemented at least in part in software, the software code can be executed on any suitable processor or collection of processors, whether provided in a single device or computer or distributed among multiple devices/computers.

The present disclosure may be implemented as a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some examples, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to examples of the disclosure. It will be understood that each block of the flowchart illustrations and/or block diagrams, and combinations of blocks in the flowchart illustrations and/or block diagrams, can be implemented by computer readable program instructions.

The computer readable program instructions may be provided to a processor of a, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various examples of the present disclosure. In this regard, each block in the flowchart or block diagrams may represent a module, segment, or portion of instructions, which comprises one or more executable instructions for implementing the specified logical function (s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Other implementations are within the scope of the following claims and other claims to which the applicant may be entitled.

While various examples have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the examples described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific examples described herein. It is, therefore, to be understood that the foregoing examples are presented by way of example only and that, within the scope of the appended claims and equivalents thereto, examples may be practiced otherwise than as specifically described and claimed. Examples of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method of controlling an Active Noise Reduction (ANR) audio system, comprising:

detecting a first audio instability condition in a first headphone based on one or more ANR parameters of a first ANR state, wherein the first ANR state causes the first headphone to reduce noise in a first frequency range or depth, wherein the first audio instability condition is related to audio feedback; and in response to detecting the first audio instability condition, altering a first ANR parameter of the one or more ANR parameters to change the first ANR state of the first headphone to a second ANR state, wherein the second ANR state causes the first headphone to reduce noise in a second frequency range or depth that is different than the first frequency range or depth; and detecting a second audio instability condition in the first headphone based on the altered first ANR parameter of the one or more ANR parameters, wherein the second audio instability condition is related to audio feedback.

2. The method of claim 1, wherein the first audio instability condition is detected based on a first threshold and the second audio instability condition is detected based on a second threshold, and the second threshold is lower than the first threshold.

3. The method of claim 1, further comprising:

generating one or more control signals to adjust the one or more ANR parameters of the first headphone using a first controller, wherein the one or more ANR parameters are adjusted to change the first headphone from the first ANR state to the second ANR state to mitigate the first audio instability condition.

4. The method of claim 3, further comprising:

adjusting one or more ANR parameters of a second headphone to match the adjusted one or more ANR parameters of the first headphone.

5. The method of claim 1, wherein the audio feedback of the first audio instability condition is related to a first microphone of the first headphone and the first microphone is arranged externally to the first headphone and externally to a user's ear canal.

6. The method of claim 4, further comprising detecting, at a first sensor of the first headphone, at a first time, whether the first headphone is engaged with or removed from an ear of a user; and detecting, at the first sensor of the first headphone, at a second time, whether the first headphone is engaged with or removed from the ear of the user.

7. The method of claim 6, further comprising returning the first headphone to the first ANR state and returning the second headphone to the first ANR state after detecting that the first headphone was removed from the ear at the first time and detecting that the first headphone was engaged with the ear at the second time.

8. The method of claim 1, further comprising prompting, a user to take out and then re-insert the first headphone by the audio system.

9. The method of claim 4, further comprising returning the first headphone to the first ANR state and returning the second headphone to the first ANR state after a predetermined amount of time passes from a time that the one or more ANR parameters of the first headphone was adjusted to bring the first headphone from the first ANR state to the second ANR state to mitigate the first audio instability condition.

10. The method of claim 3, further comprising detecting that the first headphone switched from the first ANR state to the second ANR state, from the second ANR state to the first ANR state, and then from the first ANR state to the second ANR state a predetermined number of times; and keeping the first headphone in the second ANR state.

11. The method of claim 6, wherein the first sensor of the first headphone comprises at least one of: a gyroscope, an accelerometer, an infrared sensor, a magnetometer, an acoustic sensor, a motion sensor, a piezoelectric sensor, a piezoresistive sensor, a capacitive sensor, and a magnetic field sensor.

12. An Active Noise Reduction (ANR) audio system, comprising:

a first headphone comprising:

a first controller arranged to:

detect a first audio instability condition in the first headphone based on one or more ANR parameters of a first ANR state, wherein the first ANR state causes the first headphone to reduce noise in a first frequency range or depth, wherein the first audio instability condition is related to audio feedback;

in response to detecting the first audio instability condition, alter a first ANR parameter of the one or more ANR parameters to change the first ANR state of the first headphone to a second ANR state, wherein the second ANR state causes the first headphone to reduce noise in a second frequency range or depth that is different than the first frequency range or depth; and detect a second audio instability condition in the first headphone based on the altered first ANR parameter of the one or more ANR parameters, wherein the second audio instability condition is related to audio feedback.

13. The ANR audio system of claim 12, wherein the first audio instability condition is detected based on a first threshold and the second audio instability condition is detected based on a second threshold, and the second threshold is lower than the first threshold.

14. The ANR audio system of claim 12, wherein the first controller is further arranged to:

generate one or more control signals to adjust the one or more ANR parameters of the first headphone, wherein the one or more ANR parameters are adjusted to change the first headphone from the first ANR state to the second ANR state to mitigate the first audio instability condition.

15. The ANR audio system of claim 14, further comprising a second headphone comprising a second controller, wherein the second controller is arranged to:

receive data sent from the first controller regarding the adjusted one or more ANR parameters in the first headphone; and adjust one or more ANR parameters of the second headphone to match the adjusted one or more ANR parameters of the first headphone.

16. The ANR audio system of claim 14, further comprising a first sensor of the first headphone arranged to detect at a first time whether the first headphone is engaged with or removed from an ear of a user and detect at a second time whether the first headphone is engaged with or removed from the ear of the user.

17. The ANR audio system of claim 16, wherein the first controller is arranged to return the first headphone to the first ANR state after detecting that the first headphone was removed from the ear at the first time and detect that the first headphone was engaged with the ear at the second time.

18. The ANR audio system of claim 15, wherein the first controller is arranged to return the first headphone to the first ANR state after a predetermined amount of time passes from a time that the one or more ANR parameters of the first headphone was adjusted to bring the first headphone from the first ANR state to the second ANR state to mitigate the first audio instability condition.

19. The ANR audio system of claim 14, wherein the first controller is arranged to detect that the first headphone switched from the first ANR state to the second ANR state, from the second ANR state to the first ANR state, and then from the first ANR state to the second ANR state a predetermined number of times and keep the first headphone in the second ANR state.

20. The ANR audio system of claim 16, wherein the first sensor of the first headphone comprises at least one of: a gyroscope, an accelerometer, an infrared sensor, a magnetometer, an acoustic sensor, a motion sensor, a piezoelectric sensor, a piezoresistive sensor, a capacitive sensor, and a magnetic field sensor.

* * * * *